Patented Feb. 14, 1950

2,497,398

UNITED STATES PATENT OFFICE 2,497,398

OIL BASE DRILLING FLUID

Reginald D. Dawson, Berkeley, Calif., assignor to Shell Development Company, San Francisco, Calif., a corporation of Delaware No Drawing. Application May 24, 1947, Serial No. 750,386

10 Claims. (Cl. 252—8.5)

This invention relates to the drilling of oil and gas wells and pertains more particularly to the use and composition of an improved oil base drilling fluid of the water-in-oil emulsion type.

Drilling fluids or muds are generally used when drilling wells by the rotary method. These muds are usually pumped down through the drill stem of the rotary rig and around the drill bit, returning to the surface through the annular passage between the drill stem and the well casing. Drilling fluids, circulated in this manner during the operation of drilling, fulfill the various functions of carrying cuttings to the surface, cooling and lubricating the drilling tools, sealing the walls of the borehole by forming a mudsheath thereon, and supplying a static head to overcome pressures encountered during the drilling operations that tend to blow the fluid from the borehole.

Formerly, most of the drilling fluids were either of the water-base or oil-base type depending on whether they employed water or oil (or a non-aqueous liquid) as a suspending medium or component. Of more recent development is a class of drilling fluids known as drilling emulsions wherein water is emulsified with oil to form the suspending medium.

A prime requisite of a satisfactory drilling emulsion or fluid is that it possess good plastering or sheath-forming characteristics. That is, it must form on the walls of the borehole a mudsheath effectively preventing any appreciable fluid loss to the formation. Any substantial loss of fluid to the formation is undesirable at any time during the drilling, being especially dangerous and objectionable when drilling through heavy formations such as shale, or when drilling into the producing zone, which may be contaminated and plugged by said fluid.

The term oil and water emulsions, as used here, includes two general types of emulsions: oil-in-water and water-in-oil. The present invention is mainly concerned with water-in-oil emulsions where the water is present in the dispersed phase while the oil forms the continuous phase. However, for purposes of comparison both types of oil and water emulsions are discussed.

Although the use of drilling emulsions has been found to be generally satisfactory, these emulsions are yet possessed of several drawbacks which impair their effectiveness. Thus, with reference to oil-in-water drilling emulsions, it must be noted that the water which forms the continuous phase of these emulsions penetrates and contaminates, to a certain degree, the oil-producing formation. Any substantial penetration of the oil sand by water often results in a "water-blocked" condition, i. e. the free flow of oil from the sand is retarded and the production rate of the well is reduced.

Other undesirable characteristics of oil-in-water drilling emulsions are their property of forming, under certain circumstances, relatively thick cakes or sheaths of mud on the wall of the borehole, and their lack of stability, that is, the tendency of the oil and water to stratify in the presence of even moderately high concentrations of electrolytes, such, for example, as brines entering the borehole from the formation and becoming admixed with the drilling emulsion. Thus, drilling emulsions formed by means of many of the common emulsifiers such as sulfuric acid, Turkey-red oil, soaps of fatty acids, for example sodium oleate, emulsoid colloids, for example starch or sodium alginate, etc., break down immediately or after a few hours of use or storage upon contamination with small concentrations of electrolytes, such as, for example, a 1% solution of sodium chloride.

With regard to water-in-oil emulsions, their main disadvantage resides in the difficulty of obtaining electrical logs in wells drilled therewith. The oil, as the continuous phase, acts as an insulating agent preventing the running of satisfactory electrical logs even with logging apparatus utilizing contact electrodes, such as wire-brush electrodes, whose effectiveness is impaired by the oily mudsheath formed on the walls of the borehole.

It is therefore an object of the present invention to provide an improved water-in-oil drilling emulsion having characteristics which permit the electrical logging of a borehole when filled with said emulsion.

It is also an object of this invention to provide a drilling emulsion which exhibits little or no tendency to contaminate the formations with water.

A further object of this invention is to provide a drilling emulsion adapted to form a thin mudsheath on the wall of the borehole.

Another object of this invention is to provide a water and oil drilling emulsion which is neither impaired by high temperatures nor affected by brine contamination to the extent of ordinary drilling fluids.

It is also an object of the present invention to provide a relatively heavy, balanced drilling emulsion, that is, an emulsion wherein the aqueous inner phase and the non-aqueous outer phase have approximately the same specific gravities.

These and other objects of this invention will be understood from the following detailed description of the invention.

The present invention can be practiced by adding an oil soluble polyvalent (preferably di- or trivalent) metal salt or soap of an organic carboxylic acid to a mixture of water and oil as an emulsifying and stabilizing agent in forming drilling emulsions of the water-in-oil type. The use of such an emulsifying agent yields an emulsion that forms a thin, impervious mudsheath on the borehole walls and thus prevents water, being the internal phase, from contaminating the producing formation. An added advantage is that the above emulsions do not break down readily when contaminated with formation brines. Water-in-oil drilling emulsions incorporating soaps as emulsifying and stabilizing agents according to the present invention can also be used successfully in deep wells or in wells where high temperatures are encountered as these emulsions remain stable at high temperatures, such as about 270° F. or more.

The preferred method of carrying out the objects of the present invention comprises the addition of an alkali salt of an organic carboxylic acid and a water soluble salt of a polyvalent (preferably di- or trivalent) metal to a water-in-oil drilling emulsion to form, in the emulsion, an oil soluble polyvalent (preferably di- or trivalent) metal salt or soap of an organic carboxylic acid and a water soluble, and oil insoluble, inorganic salt. The term alkali salts is meant to include alkali metal and ammonium salts. The preferred carboxylic acids are the aliphatic or non-aromatic carboxylic acids, the term aliphatic acids being used to include both the open chain and the cycloaliphatic compounds. The resulting oil soluble polyvalent salt of a non-aromatic organic carboxylic acid is the carboxylate reaction product of the above-mentioned reaction.

In general the carboxylic acid should have from 12 to 18 carbon atoms. The alkali metal or ammonium salts of saturated carboxylic acids such as lauric, palmitic, stearic, etc., may be used but similar salts of unsaturated and especially doubly unsaturated carboxylic acids, that is, of acids having one or more double bonds per molecule, such as oleic, linoleic or linolenic acid, are preferred. It has been furthermore found that drilling emulsions comprising the alkali metal salts of a mixture of rosin acids and fatty acids such as, for example, the sodium salt of tall oil or sodium tallate (which term may be used to define a sodium soap of the fatty and rosin acids of the tall oil) are particularly effective for the purposes of this invention. Any of the water soluble salts of di- and trivalent metals may be employed such as the sulfates, bromides, chlorides, etc., of magnesium, calcium, aluminum, iron, etc. It must be particularly noted that magnesium soaps are greatly preferred to others because the oil soluble salts of this metal are more efficient emulsion promoters than any other oil soluble soaps.

Thus, for example, the addition of a mixture of sodium tallate (1.5 to 5.0% by weight on the total weight of the emulsion) and magnesium sulfate $MgSO_4.7H_2O$ (0.5 to 2.0% by weight) will form, in the oil phase of the emulsion, an oil-soluble soap of magnesium tallate, which acts as an emulsifying and stabilizing agent for the emulsion, and at the same time will form a water soluble and oil insoluble inorganic salt, sodium sulfate, which dissolves in the water phase of the emulsion and converts the water phase to an electrolytic solution.

It has been found that the use of an electrolyte as the aqueous phase of the present emulsions greatly improves the quality of the electrical logs run in wells drilled with said emulsions. While it is not desired to advance any definite theory in this connection, it is believed that the electrolyte, although present in the emulsion as the discontinuous or disperse phase, becomes incorporated in the mudsheath formed on the walls of the borehole during the drilling process to form an electrically conductive skin or continuous network, which enables operators to obtain satisfactory logs by the use of contact or brush type electrodes. Thus, for example, while no significant electrical logs could be obtained, even with contact electrodes, in wells drilled in the Ventura Field, California, by means of oil base fluids or conventional water-in-oil emulsions, the use of the present drilling emulsions resulted in the production of electrical logs comparing favorably with logs obtained in wells drilled in the same field with water-base drilling fluids.

Another especially desirable characteristic of the present drilling emulsions resides in their ability to form extremely thin mudsheaths. Thus, a sample of an emulsion of this type, when tested, for example, in a Baroid plastering cell at a pressure of 500 lbs./sq. in. and a temperature of 275° F., normally deposits on the filter a mudcake having a thickness of approximately only $\frac{1}{32}$ in. after 60 minutes. This is especially important since, before putting a well on production, it is customary to wash and condition the face of the producing formation to facilitate the subsequent inflow of oil to the well. In wells where a thick mudsheath has been formed on the walls and where it is desired to install a liner screen, this conditioning operation usually involves considerable difficulties, since fragments of the mudsheath tend to clog the screen. Due to the particular texture or nature and the extremely small thickness of the mudsheaths formed by the present emulsions, however, no such difficulties are encountered.

Drilling emulsions may comprise several components which commonly include a suspending component or medium, a suspended component, a plastering agent and an emulsifying and/or stabilizing agent. The suspending medium in the case of an emulsion of the present invention is formed of oil and water, said water preferably constituting from 10 to 40% by volume of the mixture. The continuous or oil phase of the present emulsion may be in the form of any suitable non-aqueous liquid such as a mineral oil, Diesel oil, fuel oil, crude oil, kerosene, stove oil and the like. A plastering agent such as a blown asphalt is commonly incorporated in the emulsion to seal the porous walls of the borehole by forming a sheath of mud thereon. A suspended component in the form of a weighting material is commonly included in order to improve plastering to some extent and to add weight to the drilling emulsion to overcome any formation pressures encountered during drilling operations. Weighting materials commonly used are clay, crushed oyster shells, barites, magnetite, etc. However, for the purposes of the present invention the preferred weighting materials are those finely ground or powdered weighting materials having a greater tendency to be wetted by oil than by water.

These materials may be grouped generally in three classes. Substantially inert weighting materials such as clay, crushed oyster shells, barites, iron oxide and the like may be made preferentially oil wettable by suitable treatment in a manner well known in the art. A second class of such materials comprises naturally occurring substances exhibiting the property of being preferentially oil wettable, notably the metallic sulfides of iron, zinc, lead and the like. A third class of mineral substances, when finely ground (in the range of 80% through a 325 mesh sieve), exhibit the property of being readily wettable by oil. Of this class the mineral preferred for the purposes of this invention is hematite, which may be readily incorporated in water-in-oil drilling emulsions to yield emulsions of relatively heavy weights (90 to 120 lbs. per cubic foot) and of good viscosity characteristics, so that they are readily pumpable. However, weighting material in heavy drilling emulsions of the above type which do not contain an oil soluble soap of the present invention as an emulsifier, such as tall oil soap, tend to settle out rapidly, forming a hard bottom sediment which cannot be circulated out of the well, whereas similar heavy emulsions comprising an oil soluble soap of the present invention yield a soft bottom sediment that is readily pumpable. These heavy emulsions (90 to 120 lbs. per cubic foot) also exhibit excellent plastering qualities when the disperse water phase of the emulsion ranges from 10 to 40% by volume. Heavy emulsions comprising an oil soluble soap of the present invention as an emulsifying agent also form a more impervious mudsheath on the wall of the borehole than those mixed with other types of emulsifying agents, which is of great importance to minimize fluid losses to the formation, and thus lessen the thickness of the mudsheath, as may be seen from the following table:

by volume, has been admixed with the oil phase by means of the emulsifying agent of the present invention. Now, it has been found that a water-in-oil emulsion of equally good stability and plastering qualities may be prepared by adding to the emulsion a water solution of an inorganic salt, as previously mentioned, such as calcium bromide, calcium nitrate, magnesium nitrate, or preferably calcium chloride, said salt being used in sufficient quantity to form a concentrated or substantially saturated solution. In the making of balanced emulsions, the concentration of the electrolyte in the disperse phase can be varied practically from zero to saturation without altering the stability of the emulsion. The object is, of course, to raise the gravity of the water phase as nearly as possible to that of the continuous phase, and the amount of electrolyte added will depend on the weight of the finished mud required. Thus, if the specific gravity of the latter is 1.1, sufficient electrolyte (say, 12% of calcium chloride) would be added to the water to give that gravity to the internal phase. On the other hand, if a mud of gravity 1.4 is desired, a saturated solution of the electrolyte (say, 40% of calcium chloride) would have to be used. Since the specific gravity of the concentrated solution of the salt is greater than that of water, and may be made to equal, or approach closely that of the oil phase, the tendency of the emulsion to cream is practically precluded, and the amount of hematite added to the continuous phase can be reduced while still obtaining an emulsion with a 1.44 overall specific gravity.

An inorganic salt used in the manner described above, where it is added to the water of the disperse phase, is preferably one such as calcium chloride which is highly soluble in water, and does not break the emulsion or impair the effectiveness of the emulsifying agents of the present invention. If it is desired to use such salts to make even heavier drilling emulsions, say 120 lbs. per cubic foot, it may be first necessary to

| Drilling Fluid | | Composition | | | Filter [1] Loss | Cake Thickness, Inches |
| --- | --- | --- | --- | --- | --- | --- |
| | | Water | Oil | Oil Soluble Soap, Parts by Weight | | |
| No. | S. G. | Parts by Volume | | | | |
| 1 | 1.14 | 20.0 | 67.0 | 5.0 | 0.21 | 1/32 (approx.) |
| 2 | 1.32 | 28.0 | 53.0 | 1.8 | 0.19 | 1/32 (approx.) |
| 3 | 1.76 | 20.0 | 53.0 | 2.0 | 0.22 | 1/16 (approx.) |
| 4 | 1.61 | 35.0 | 43.0 | 1.6 | 0.22 | 1/16 (approx.) |

[1] Loss in cubic cms. per square cm. of filter area at 275° F. and 500 lbs./sq. in.

The present invention is of especial importance in the preparation of "balanced emulsions" i. e. emulsions wherein the aqueous and the non-aqueous fluid phases have specific gravities nearly equal to each other. In any emulsion where the continuous and disperse phases are of different densities, there is a tendency toward "creaming" or separation into two layers by the action of gravity. This does not imply an actual breaking of the emulsion and can be obviated by making the specific gravities of the two phases of the present emulsions as nearly equal to each other as possible.

As an example, in the mixing of a heavy (90 lbs. or more per cubic foot) drilling emulsion of the present invention, a finely ground weighting material such as hematite may be added to the continuous or oil phase in sufficient quantity to yield an emulsion with an overall specific gravity of 1.44 when a disperse water phase of, say, 20% raise the specific gravity of the salt solution by the addition of weighting materials such as clay, barites, and the like, which should be preferentially water wettable. Heavy drilling emulsions weighing from 120 to 130 lbs. per cubic foot may be made in this manner according to the present invention.

I claim as my invention:

1. A drilling fluid for wells, comprising a water-in-oil emulsion of approximately 10 to 40% by volume of water with 90 to 60% by volume of a mineral oil, finely dispersed hematite suspended in said emulsion in amounts sufficient to substantially raise the density of the drilling fluid and approximately 0.5 to 5.0% by weight of the total emulsion of an oil soluble polyvalent metal salt of an organic carboxylic acid as an emulsifying agent.

2. A heavy drilling fluid for wells weighing from 90 to 120 pounds per cubic foot comprising a water-in-oil emulsion of approximately 10 to 40% by volume of water and 90 to 60% by volume of a mineral oil, finely dispersed hematite suspended in said emulsion and approximately 1.5 to 5.0% by weight of the total emulsion of an oil soluble polyvalent metal salt of an organic carboxylic acid as an emulsifying agent.

3. For use as a drilling fluid for wells, a water-in-oil emulsion comprising approximately from 10 to 40 per cent by volume of water as the internal phase, 90 to 60 per cent of a mineral oil, a finely dispersed solid material suspended in said emulsion, approximately 0.5 to 5 per cent by weight of the total emulsion of an oil soluble polyvalent metal salt of a doubly unsaturated carboxylic acid as an emulsifying agent, said internal phase having a water soluble inorganic salt dissolved therein to form an electrolyte.

4. For use as a drilling fluid for wells, a water-in-oil emulsion comprising approximately from 10 to 40 per cent by volume of water as the internal phase, 90 to 60 per cent of a mineral oil, a finely dispersed solid material suspended in said emulsion, approximately 0.5 to 5 per cent by weight of the total emulsion of an oil soluble divalent metal salt of a doubly unsaturated carboxylic acid as an emulsifying agent, said internal phase having a water soluble inorganic salt dissolved therein to form an electrolyte.

5. For use as a drilling fluid for wells, a water-in-oil emulsion comprising approximately from 10 to 40 per cent by volume of water as the internal phase, 90 to 60 per cent of a mineral oil, a finely dispersed solid material suspended in said emulsion, approximately 0.5 to 5 per cent by weight of the total emulsion of an oil soluble magnesium salt of a doubly unsaturated carboxylic acid as an emulsifying agent, said internal phase having a water soluble inorganic salt dissolved therein to form an electrolyte.

6. A drilling fluid for use in a well, containing an emulsion of water in oil, a finely divided solid material dispersed in the emulsion in amounts sufficient to permit the drilling fluid to overcome the pressure of the well, an oil soluble polyvalent metal salt of an organic carboxylic acid, and a water soluble inorganic salt said polyvalent metal salt and said water-soluble inorganic salt being obtained by reacting from 0.5% to 5.0% by weight of the total emulsion of an oil-soluble monovalent salt of an organic carboxylic acid with from 0.5% to 2.0% by weight of the total emulsion of a water-soluble salt of a polyvalent metal.

7. A drilling fluid for use in a well, containing an emulsion of water in oil, an amount of finely divided solid material dispersed therein, said amount being sufficient to permit the drilling fluid to overcome the pressure of the well, and an amount of reaction products of from 0.5% to 5.0% by weight of the total emulsion of an alkali salt of an organic carboxylic acid and from 0.5% to 2.0% by weight of the total emulsion of a water soluble salt or a polyvalent metal, said amount being sufficient to stabilize said emulsion and to substantially improve its properties as medium for the electrical logging of the well.

8. The composition of claim 6, wherein the water soluble salt is that of a divalent metal.

9. The composition of claim 7, wherein the carboxylic acid has from 12 to 18 carbon atoms.

10. A drilling fluid for use in a well containing an emulsion of water in oil, an amount of finely divided solid material dispersed therein, said amount being sufficient to permit the drilling fluid to overcome the pressure of the well, and the reaction products of from 0.5% to 5.0% by weight of the total emulsion of the sodium salt of tall oil with from 0.5% to 2% by weight of the total emulsion of magnesium sulfate, said amount being sufficient to stabilize said emulsion and to substantially improve its properties as medium for the electrical logging of the well.

REGINALD D. DAWSON.

REFERENCES CITED

The following references are of record in the file of this patent:

UNITED STATES PATENTS

| Number | Name | Date |
|---|---|---|
| 2,144,808 | Parker | Jan. 24, 1939 |
| 2,175,491 | Stresen-Reuter et al. | Oct. 10, 1939 |
| 2,216,955 | Moore | Oct. 8, 1940 |
| 2,217,926 | Van Campen | Oct. 15, 1940 |
| 2,297,660 | Mazee | Sept. 29, 1942 |
| 2,360,992 | Weiss | Oct. 24, 1944 |
| 2,430,039 | Anderson | Nov. 4, 1947 |

OTHER REFERENCES

Berkman et al.: Emulsions and Foams, published 1941 by Reinhold Publishing Corporation of New York, pp. 58, 60, 61, 62 and 63.

Certificate of Correction

Patent No. 2,497,398 — February 14, 1950

REGINALD D. DAWSON

It is hereby certified that error appears in the printed specification of the above numbered patent requiring correction as follows:

Column 8, line 12, for the words "salt or" read *salt of*;

and that the said Letters Patent should be read with this correction therein that the same may conform to the record of the case in the Patent Office.

Signed and sealed this 4th day of July, A. D. 1950.

[SEAL]

THOMAS F. MURPHY,
*Assistant Commissioner of Patents.*